(12) United States Patent
Raj

(10) Patent No.: US 6,838,191 B1
(45) Date of Patent: Jan. 4, 2005

(54) BLANCH RESISTANT AND THERMAL BARRIER NIAL COATING SYSTEMS FOR ADVANCED COPPER ALLOYS

(75) Inventor: Sai V. Raj, Strongsville, OH (US)

(73) Assignee: The United States of America as represented by the Admistrator of the National Aeronautics and Space Administration, Washington, DC (US)

(*) Notice: Subject to any disclaimer, the term of this patent is extended or adjusted under 35 U.S.C. 154(b) by 9 days.

(21) Appl. No.: 10/441,028

(22) Filed: May 20, 2003

(51) Int. Cl.⁷ .............................. B32B 15/01; C23C 4/06
(52) U.S. Cl. .................. 428/675; 428/674; 428/680; 428/652; 428/671; 427/455; 427/456; 427/369; 427/370
(58) Field of Search .......................... 427/455, 456, 427/369, 370; 428/655, 674, 680, 650, 652, 671, 675

(56) References Cited

U.S. PATENT DOCUMENTS

| | | | |
|---|---|---|---|
| 4,145,481 A | * | 3/1979 | Gupta et al. |
| 4,198,442 A | * | 4/1980 | Gupta et al. |
| 4,370,789 A | * | 2/1983 | Schilke et al. |
| 5,557,927 A | | 9/1996 | Chiang et al. |
| 5,981,088 A | | 11/1999 | Bruce et al. |
| 5,997,957 A | | 12/1999 | Bertamini et al. |
| 6,040,067 A | | 3/2000 | Sugawara et al. |
| 6,153,313 A | | 11/2000 | Rigney et al. |
| 6,277,499 B1 | | 8/2001 | Beers et al. |
| 6,291,084 B1 | | 9/2001 | Darolia et al. |
| 6,314,720 B1 | | 11/2001 | Holmes et al. |
| 6,352,788 B1 | | 3/2002 | Bruce |

* cited by examiner

Primary Examiner—Jennifer McNeil
(74) Attorney, Agent, or Firm—Squire, Sanders & Dempsey LLP

(57) ABSTRACT

A method of forming an environmental resistant thermal barrier coating on a copper alloy is disclosed. The steps include cleansing a surface of a copper alloy, depositing a bond coat on the cleansed surface of the copper alloy, depositing a NiAl top coat on the bond coat and consolidating the bond coat and the NiAl top coat to form the thermal barrier coating. The bond coat may be a nickel layer or a layer composed of at least one of copper and chromium-copper alloy and either the bond coat or the NiAl top coat or both may be deposited using a low pressure or vacuum plasma spray.

16 Claims, 6 Drawing Sheets

![US 6,838,191 B1]

BLANCH RESISTANT AND THERMAL BARRIER NIAL COATING SYSTEMS FOR ADVANCED COPPER ALLOYS

ORIGIN OF THE INVENTION

The invention described herein was made by an employee of the United States Government and may be manufactured and used by or for the Government for Government purposes without payment of any royalties thereon or therefore.

BACKGROUND OF THE INVENTION

1. Field of the Invention

The present invention relates to an environmental and thermal barrier overlay coating system is described for advanced copper alloys for possible use in reusable launch vehicles and other similar applications. In particular, the present invention addresses issues related to the design and deposition of suitable coatings and bond coating technology for protecting an advanced copper alloy known as GRCop-84.

2. Description of Related Art

Copper alloys, containing chromium and niobium, are being considered for use as combustor and nozzle liners in reusable launch vehicle (RLV) applications. The combustion chamber of a rocket engine is exposed to a high heat flux and gas pressure. Experience has shown that unprotected copper alloys undergo a degradation in properties and life during use in rocket engines due to a process called blanching, where the material undergoes repetitive cycles of oxidation and reduction by the hydrogen/oxygen combustion mixture finally leading to failure or reduced useful life of the component.

Other complications arise due to thermal fatigue of the metallic cooling channels carrying liquid hydrogen ($LH_2$). This process leads to a process known as a "dog house" effect, where initially square coolant channels attain the shape of a dog house and eventually fail with the subsequent loss of $LH_2$ and poor engine performance. This problem is especially critical since the wall thickness of the cooling channels is about 1.0 mm.

The two characteristics of the problem are environmental attack of the surfaces of the copper alloy combustor liners and nozzles and thermal fatigue of these components.

Wear and abrasion resistant coatings have been developed for copper alloys, such as those disclosed in Sugawara et al., U.S. Pat. No. 6,040,067. Chiang et al. proposed using Cu-30+10 vol. % Cr as blanch resistant coating for copper alloy rocket engine combustion chamber linings (U.S. Pat. No. 5,557,927). An oxidation resistant coating having a copper-aluminum alloy and a cobalt-based alloy diffusion barrier has been reported (See, U.S. Pat. No. 6,277,499, by Beers et al.) and a method of fabricating the combustion chamber for a rocket engine with suitable metallic or ceramic coating by low pressure or vacuum plasma spraying, where the composition of the component was functionally graded from the protective coating on the inside to a Cu-8(at. %)Cr-4(at. %)Nb (GRCop-84) alloy on the outside. (See, U.S. Pat. No. 6,314,720, by Holmes et al.).

Additionally, nickel aluminide coatings, NiAl, having intermetallic compounds, have been used to coat nickel-based superalloy turbine blades and vanes in aircraft engines as a bond coat (See, Bruce et al., U.S. Pat. Nos. 5,981,088 and 6,352,788) or as a top coat (See, Rigney et al., U.S. Pat. Nos. 6,153,313 and 6,291,084).

However, all of the above cited coatings have limitations. Several have low melting points and therefore are unlikely to be useful as overlay coatings for rocket combustion chamber liners. Some are specifically applicable to nickel-based superalloy turbine airfoils. The approach adopted by Holmes et al. does not involve overlay coatings, since it involves fabricating the entire component by gradually changing the composition from the inner to the outer surface. However, the ability to fabricate large RLV combustor components by such a technique is unproven. The Cu-30 (vol. %)Cr coating proposed by Chiang et al. is unlikely to be effective at temperatures above 873 K in applications requiring a large number of mission cycles due to the increased possibility of spallation and coating degradation.

None of the cited prior art deals with the development of NiAl overlay coatings and methods of applying them on advanced copper alloys, such as Cu-8(at. %)Cr-4(at. %)Nb. This new overlay coating should provide a suitable high temperature environmentally resistant thermal barrier coating for reusable launch vehicle rocket engines.

SUMMARY OF THE INVENTION

The present invention seeks to identify suitable environmentally resistant thermal barrier coating alloy and develop techniques for depositing it as an overlay coating on GRCop-84 and other copper alloy substrates being considered for reusable launch vehicle rocket engines. The present invention also seeks to demonstrate the suitability of the coating for use in a hydrogen and an oxidation environment, and the superior thermal cycling performance of the coated alloy when compared to the uncoated substrate at and below temperatures of 600° C.

According to one aspect of this invention, a method of forming a thermal barrier coating on a copper alloy is disclosed. The steps include cleansing a surface of a copper alloy to remove dirt and surface oxides, depositing a bond coat on the cleansed surface of the copper alloy, depositing a NiAl top coat on the bond coat and consolidating the bond coat and the NiAl top coat to form the environmentally resistant thermal barrier coating.

Additionally, the copper alloy may be an alloy having a composition of Cu-8(at. %)Cr-4(at. %)Nb. The bond coat may be a nickel layer or a layer composed of at least one of a copper-chromium alloy or pure copper. Either the bond coat or the NiAl top coat may be deposited using a low pressure or vacuum plasma spray. It is expected that ductile bond coats may also be applied by cold spraying, arc spraying, physical vapor deposition, chemical vapor deposition and other similar techniques. The bond coat and the NiAl top coat may be consolidated through hot isostatically pressing. Also, the NiAl top coat may be a layer having an aluminum content of between 30–60 at. %.

According to another embodiment, a coating for a combustion chamber and nozzle applications of a rocket engine is disclosed. The coating includes a bond coat applied to the surface of a copper alloy substrate and a NiAl top coat applied on the bond coat. The bond coat and the NiAl top coat are consolidated to form an environmentally resistant thermal barrier coating and the combustion chamber and the nozzle components are composed of a copper alloy.

These and other objects of the present invention will be described in or be apparent from the following description of the preferred embodiments.

BRIEF DESCRIPTION OF THE DRAWINGS

For the present invention to be easily understood and readily practiced, preferred embodiments will now be described, for purposes of illustration and not limitation, in conjunction with the following figures.

DETAILED DESCRIPTION OF PREFERRED EMBODIMENTS

Figure 1:
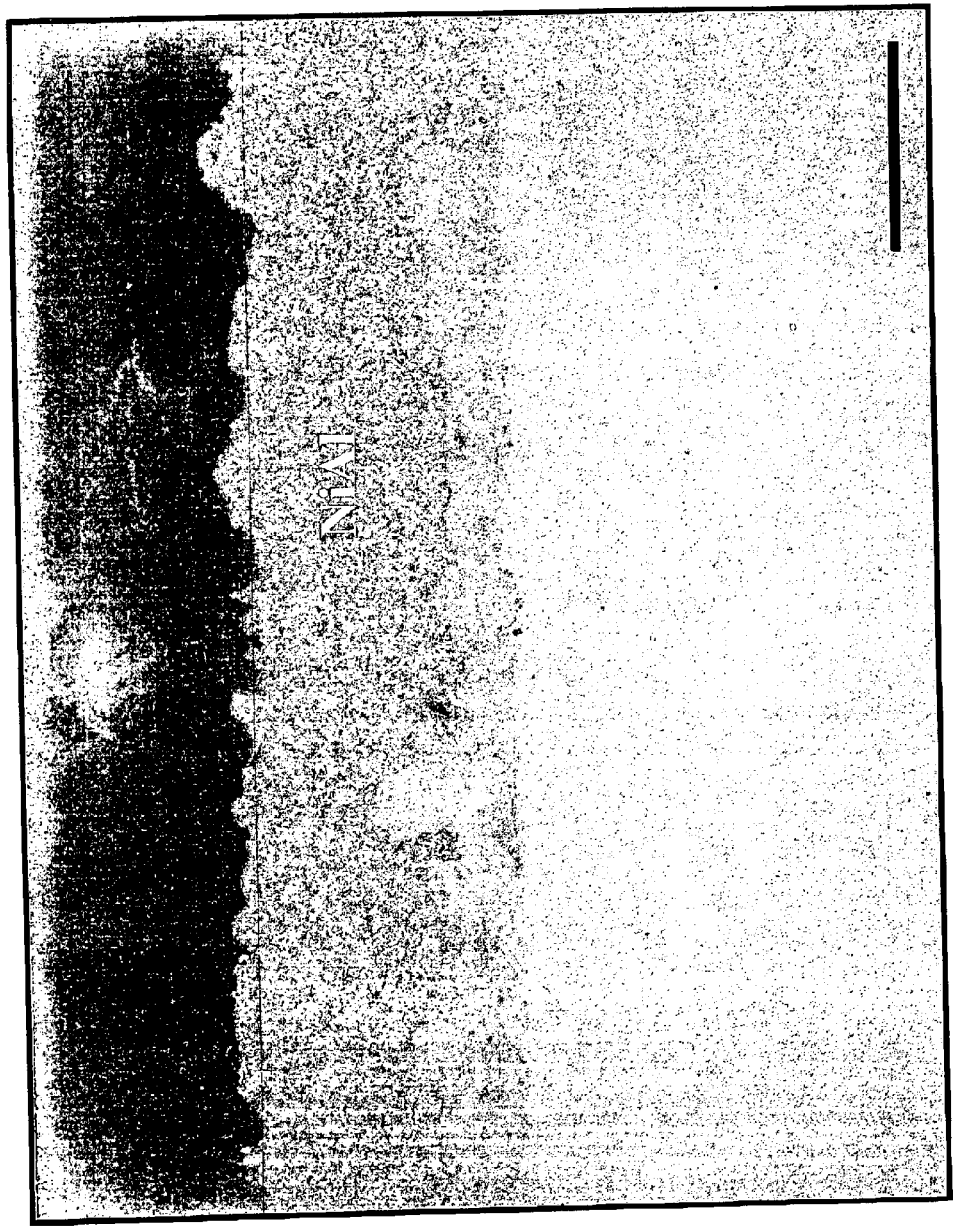
FIG. 1 provides an optical micrograph of the cross-section of an as-sprayed GRCop-84 substrate coated with a Ni bond coat and a NiAl top coat.

An environmental and thermal barrier overlay coating system is described for advanced copper alloys for possible use in reusable launch vehicles and other similar applications. The present invention addresses issues related to the design and deposition of suitable coatings and bond coating technology for protecting an advanced copper alloy known as GRCop-84. Nickel aluminide (NiAl) top coats and nickel bond coats were applied to the surface of GRCop-84 disk specimens by a low pressure or vacuum plasma spraying process. Also, the present invention encompasses other bond coats using copper and copper-chromium alloys. Microstructural observations have been conducted on the as-sprayed and heat treated or hot isostatically pressed coating-substrate interfaces and verify the properties of those overlay coatings.

Additionally, chemical and thermal stability studies have been conducted both in air and hydrogen. Cyclic oxidation and propane-oxygen blow torch tests have been conducted in air to determine the oxidation and thermal protective capabilities of the coatings. The coated substrates do not exhibit any significant change in weight in the cyclic tests even after a cumulative time of 500 hrs. In comparison, the uncoated specimen lost about 30% of its weight after in the same period. The coated specimen has also been subjected to 10 cycles under a propane blow torch with no noticeable change.

One of the unique features of this invention is to advantageously use the thermophysical and environmental properties of NiAl to provide environmental and thermal protection of the copper alloy substrate. A method has been developed for applying the NiAl coating to the GRCop-84 substrate using a Ni bond coat. In one embodiment, the coating system consisting of NiAl/bond coat/GRCop-84 provides adequate environmental and thermal protection to the copper alloy substrate.

The present invention seeks to identify suitable environmentally resistant thermal barrier coating alloy and develop techniques for depositing it as an overlay coating on GRCop-84 and other copper alloy substrates being considered for reusable launch vehicle rocket engines. The present invention also seeks to demonstrate the suitability of the coating for use in hydrogen, hydrocarbon and oxidation environments, and the superior thermal cycling performance of the coated alloy when compared to the uncoated substrate at and below temperatures of 923 K.

The fabrication and the performance of a coating system consisting of NiAl as an overlay top coat, Ni, Cu or a Cu—Cr alloy as a bond coat, and as Cu-8(at. %)Cr-4(at. %)Nb substrate is described, according to one embodiment of the invention. NiAl was chosen, for many of the embodiments, as the top coat for several reasons: (a) it has an excellent oxidation resistance, (b) high melting temperature, (c) large solid solubility, (d) relatively high thermal conductivity compared to MCrAlY, where M is Co, Fe or Ni and ceramic coatings, (e) high emissivity, (f) ability to obtain a mirror-like finish to enhance thermal protection properties, and (g) the likelihood that it would be stable in a hydrogen and a hydrocarbon environment from thermodynamic considerations.

It is necessary to add a bond coat to ensure adherence of the top coat to the substrate. The Al content of the NiAl coating can vary between 30 to 60 at. %, Zr from 0 to 0.5 at. % with the balance being nickel. The bond composition can be 0 to 100(at. %) Ni, or a Cu—Cr alloy with 0 to 90(at. %) Cr.

Detailed thermal modeling studies were conducted to predict the temperature characteristics of a NiAl/bond coat/GRCop-84 coated system. These calculations revealed that the NiAl top coat is likely to experience a maximum temperature of 873 K under heat flux conditions typical in a rocket engine combustion chamber. The surface of the copper alloy substrate was grit blasted with alumina particles at a low blasting pressure and ultrasonically cleansed in alcohol. The bond coat was then deposited on the substrate by low pressure or vacuum plasma spraying and this was followed by depositing the NiAl top coat by the same process. Consolidation of the overlay and bond coats was conducted by hot isostatically pressing (HIP) at suitable pressure, temperatures, and hold times. Other consolidation techniques can also be used, e.g. diffusion anneal, hot pressing, ultrasonic consolidation and heat treatment with the plasma flame as the final step of the spraying process.

Figure 2:
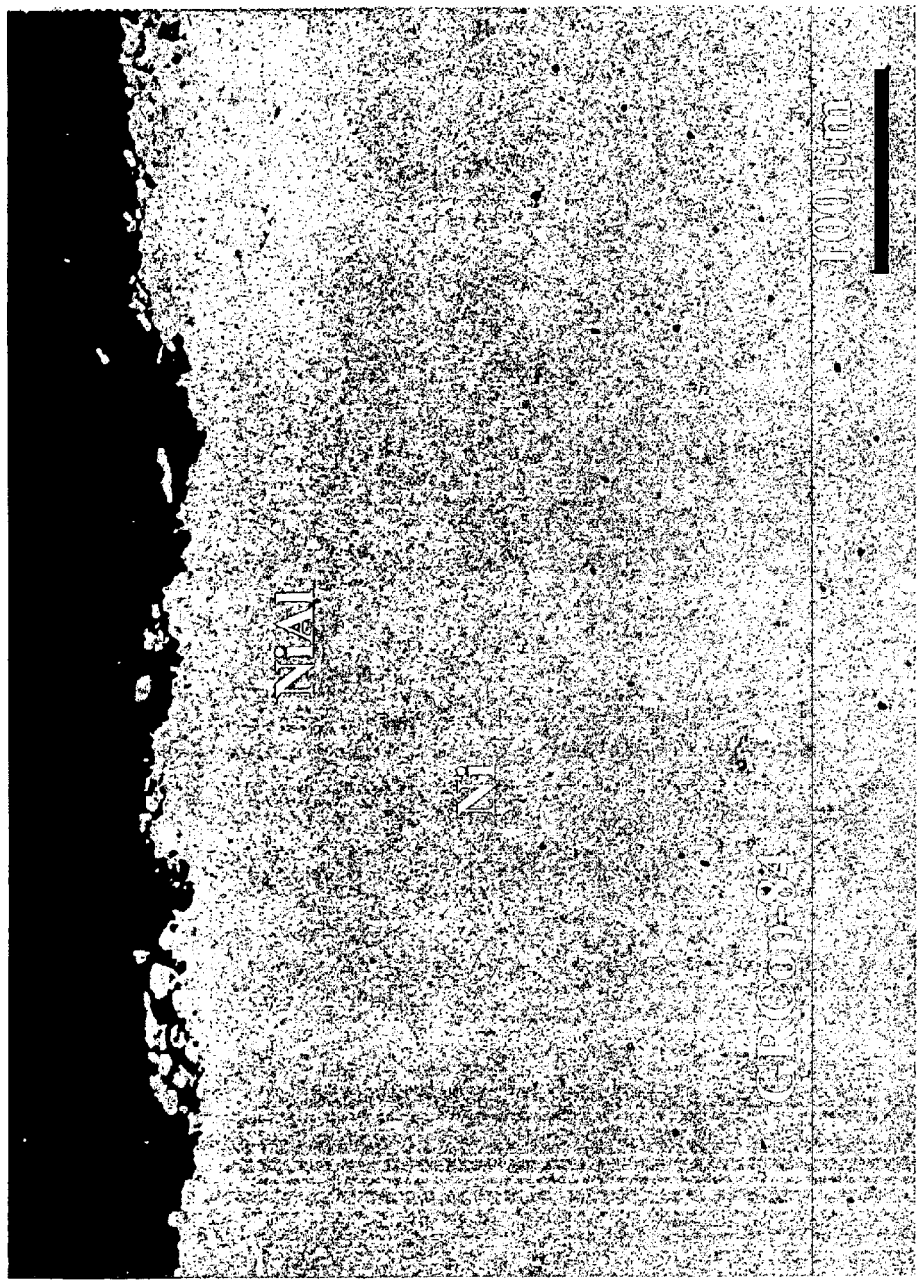
FIG. 2 illustrates an optical micrograph of the cross-section of a vacuum plasma sprayed and hot-isostatically pressed GRCop-84 substrate coated with a Ni bond coat and a NiAl top coat.

FIG. 1 shows a typical micrograph of a polished cross-section NiAl/Ni/GRCop-84 system in the as-sprayed condition. FIG. 2 shows the polished cross-section of a HIPed NiAl/Ni/GRCop-84 system showing nearly full consolidation of the top and bond coats. The compatibility of the coated substrate in a hydrogen environment was assessed by heat treating several specimens at 1173 K in flowing 100% hydrogen gas for annealing times up to 50 hours. This temperature approximately corresponds to the brazing temperature for combustion liners.

Figure 3:
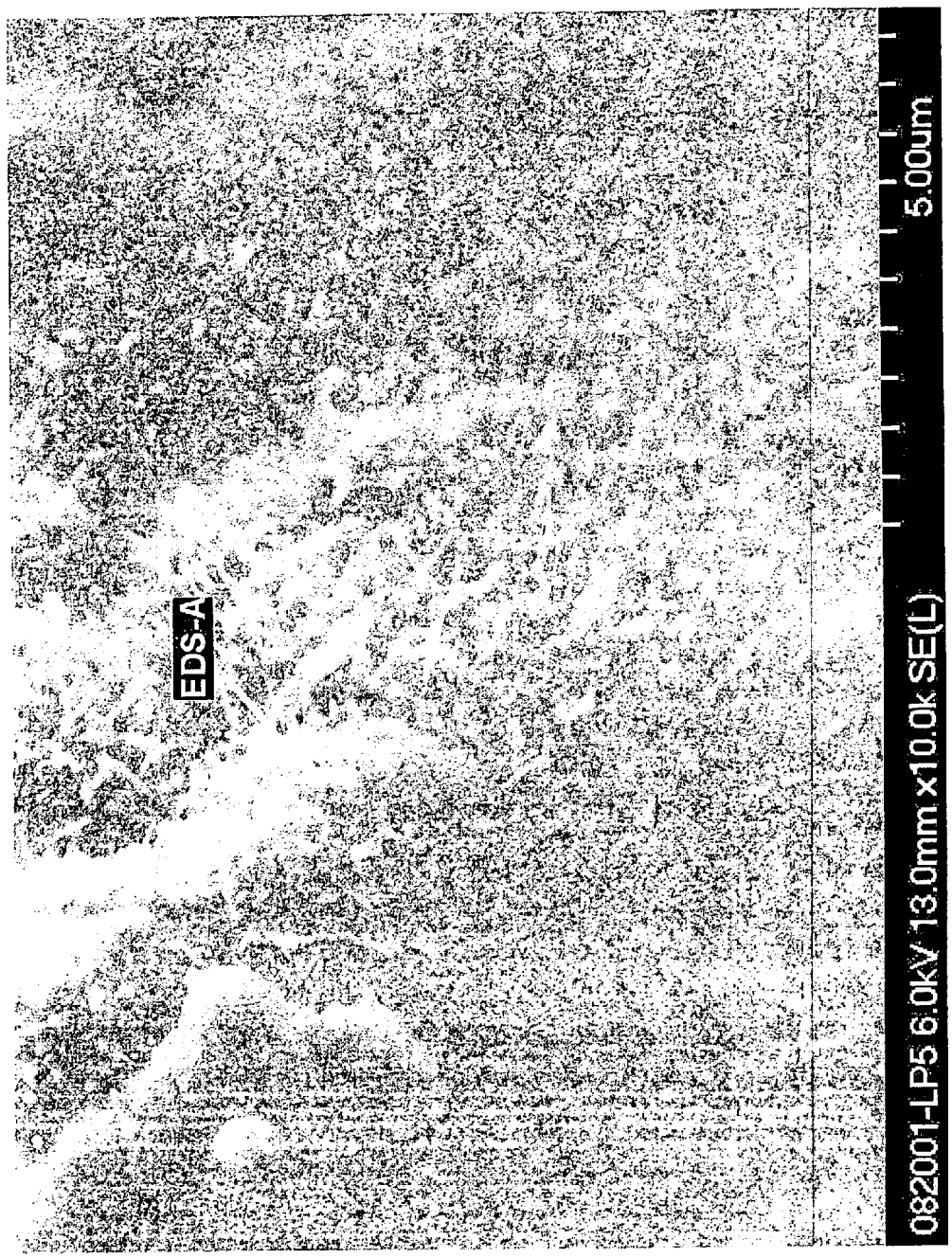
FIG. 3(a) illustrates a scanning electron micrograph of the NiAl top coat after annealing a NiAl/Ni/GRCop-84 specimen at 1173 K in flowing hydrogen for 50 hrs and FIG. 3(b) illustrates an energy dispersive spectroscopic analysis of the NiAl top coat depicted in FIG. 3(a) showing the formation of $Al_2O_3$ after the annealing treatment.
Figure 3B:
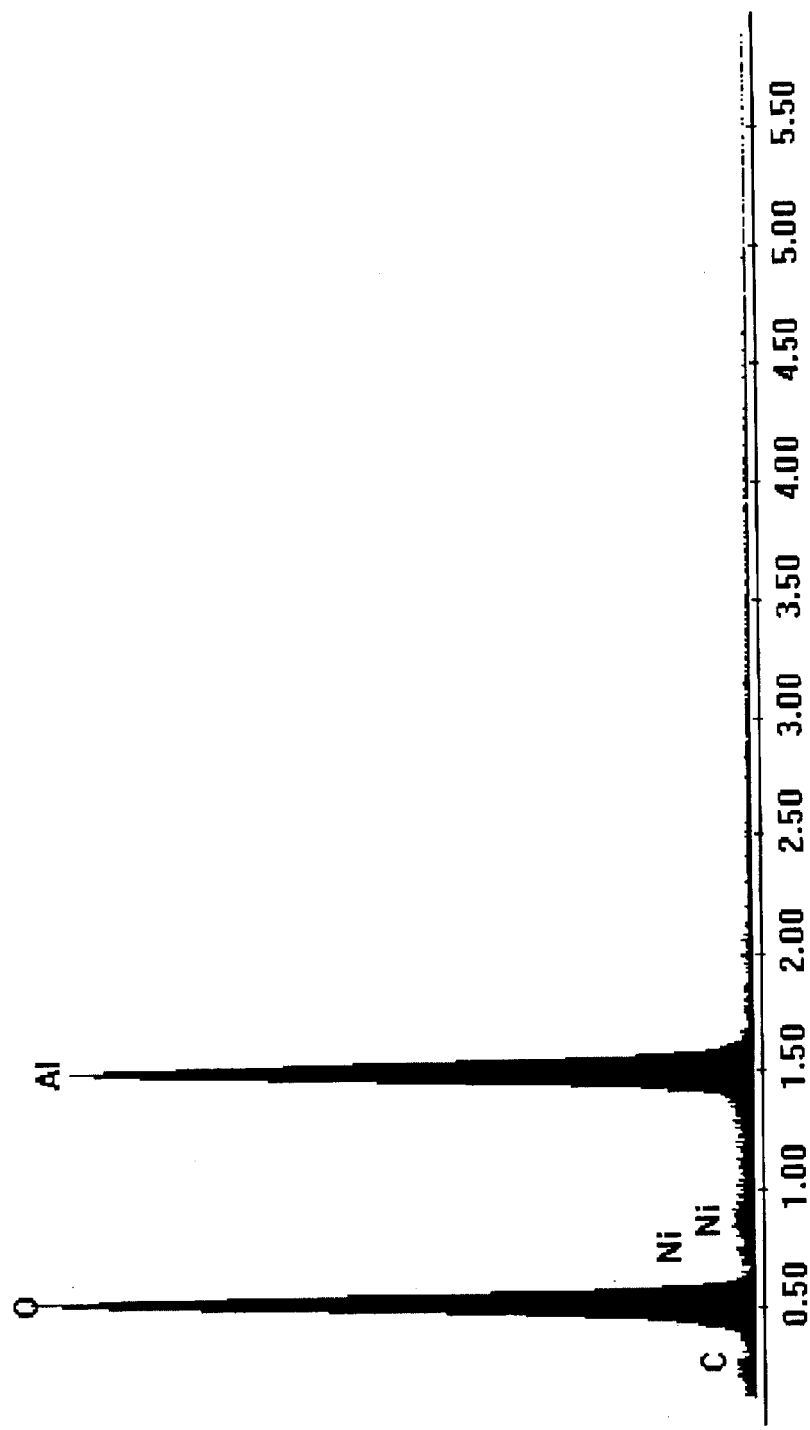

FIG. 3(a) shows a scanning electron micrograph of the surface of the coated substrate after a 50 hour exposure to hydrogen, while FIG. 3(b) shows the energy dispersive spectrum (EDS) from the same surface. It is evident that a protective oxidation resistant alumina layer has formed on the surface, and there was no evidence of any nickel hydride on the surface. These observations confirm the chemical stability of the coating system in a hydrogen environment. An as-sprayed coated substrate was thermally cycled at 873 K with a 10 minute exposure at temperature followed by a 5 minute natural cool down to an ambient surface temperature prior to re-exposure at 873 K.

Figure 4:
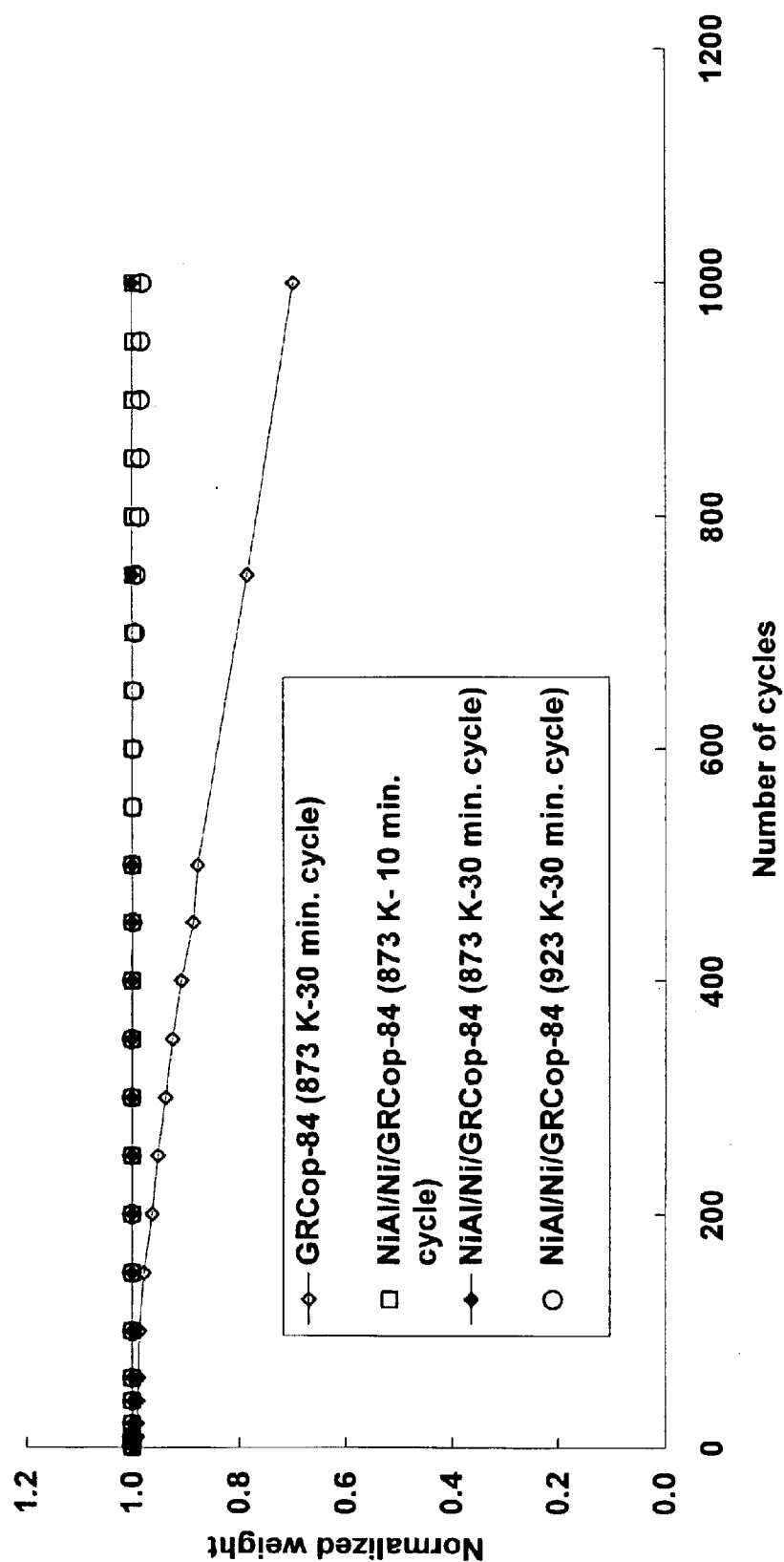
FIG. 4 illustrates a comparison of the variation in the normalized weight of NiAl-coated and uncoated GRCop-84 specimens as a function of the number of thermal cycles at 873 and 923 K.
Figure 5:
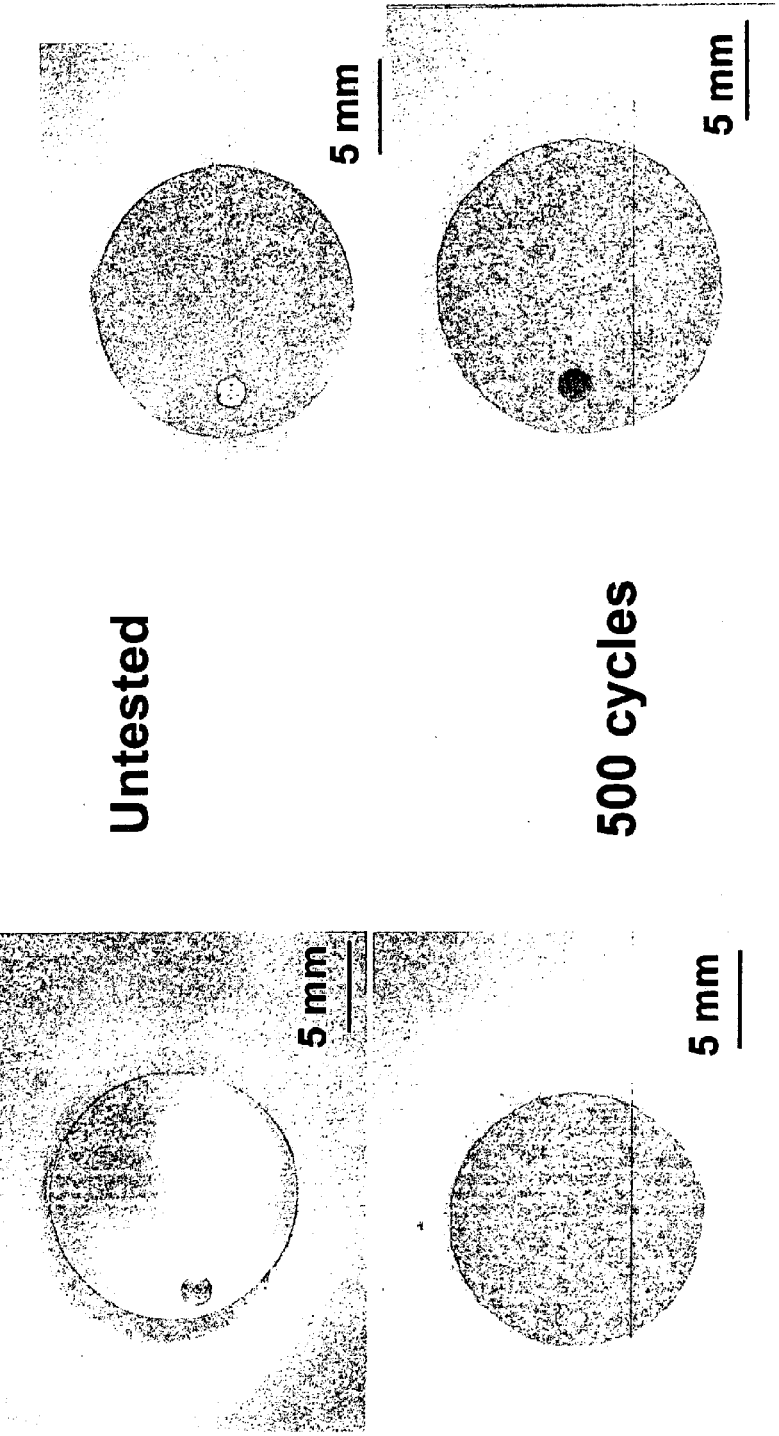
FIG. 5 provides optical macrographs showing the surfaces of NiAl-coated and uncoated GRCop-84 disks before and after thermally cycling at 873 K for 500 cycles.

FIG. 4 compares the normalized weight change of the coated substrate with that of an uncoated substrate. It should be noted that the uncoated substrate was cycles at 873 K and ambient temperature, where the specimen was exposed to temperature for 30 minutes. Clearly, the normalized weight change for the coated substrate is negligible compared to that for the uncoated specimen even after 500 hours of cumulative cyclic exposure. The x-ray diffraction pattern of the surface revealed only NiAl peaks.

An as-sprayed coated substrate was subjected to a propane-oxygen flame. The specimen was held in a water-cooled copper holder and its backside was subjected to forced air cooling. The NiAl top coat was maintained at about 873 K for 10 minutes followed by a 2 minute cool down to room temperature during each cycle. No spalling of the coating was observed after 10 cycles. The backside temperature was observed to be substantially lower than the front side temperature although the actual measurements were imprecise.

The NiAl top coat is expected to act as a thermal protection barrier for the substrate in part by emitting part of the heat from the combustion flame and in part by conducting it away through the bond coat to the GRCop-84 substrate, which will be cooled on the backside by either liquid hydrogen or coolant. The function of the bond coat is to ensure adherence of the NiAl to GRCop-84 as well as to provide a compliant, thermally conductive layer to accommodate the stresses at the interfaces.

The bond coat considered in these experiments was commercial grade nickel powder. Other bond coats include pure copper and Cu—Cr alloys, where the chromium content varies from 0 to 90 (at. %) Cr. Also, the method of application the coating consisted of directly spraying the powder on a substrate. An alternative technique includes the following steps: (i) low pressure or vacuum plasma spray the NiAl coating and the bond coat on a highly polished stainless steel mandrel, (ii) spray the GRCop-84 or other copper alloy with a layer of the bond coat, (iii) diffusion bond the coated copper alloy liner and coated mandrel and (iv) removal of the mandrel to leave a combustion liner with a highly polished NiAl inner surface with an outer GRCop-84 layer.

Although the invention has been described based upon these preferred embodiments, it would be apparent to those of skilled in the art that certain modifications, variations, and alternative constructions would be apparent, while remaining within the spirit and scope of the invention. In order to determine the metes and bounds of the invention, therefore, reference should be made to the appended claims.

What is claimed is:

1. A method of forming a thermal barrier coating on a copper alloy, the method comprising the steps of:
    cleansing a surface of a copper alloy;
    depositing a bond coat on the cleansed surface of the copper alloy;
    depositing a NiAl top coat on the bond coat; and
    consolidating the bond coat and the NiAl top coat to form a thermal barrier coating;
    wherein the NiAl top coat comprises an outermost coat.

2. The method as recited in claim 1, wherein the step of depositing a bond coat comprises depositing a nickel layer.

3. The method as recited in claim 1, wherein the step of depositing a bond coat comprises depositing the bond coat using a vacuum plasma spray technique.

4. The method as recited in claim 1, wherein the step of depositing a NiAl top coat comprises depositing the NiAl top coat using a vacuum plasma spray technique.

5. The method as recited in claim 1, wherein the NiAl top coat comprises a layer having an aluminum content of between 30–60 at. %.

6. A method of forming a thermal barrier coating on a copper alloy, the method comprising the steps of:
    cleansing a surface of a copper alloy;
    depositing a bond coat on the cleansed surface of the copper alloy;
    depositing a NiAl top coat on the bond coat; and
    consolidating the bond coat and the NiAl top coat to form a thermal barrier coating;
    wherein the step of cleansing a surface of a copper alloy comprises cleansing a surface of a copper alloy having a composition of Cu-8(at. %)Cr-4(at. %)Nb.

7. A method of forming a thermal barrier coating on a copper alloy, the method comprising the steps of:
    cleansing a surface of a copper alloy;
    depositing a bond coat on the cleansed surface of the copper alloy;
    depositing a NiAl ton coat on the bond coat; and
    consolidating the bond coat and the NiAl top coat to form a thermal barrier coating;
    wherein the step of depositing a bond coat comprises depositing a layer composed of at least one of copper and an alloy of copper and chromium.

8. A method of forming a thermal barrier coating on a copper alloy the method comprising the steps of:
    cleansing a surface of a copper alloy;
    depositing a bond coat on the cleansed surface of the copper alloy;
    depositing a NiAl top coat on the bond coat; and
    consolidating the bond coat and the NiAl top coat to form a thermal barrier coating; wherein the step of consolidating the bond coat and the NiAl top coat comprises consolidating the bond coat and the NiAl top coat through hot isostatically pressing.

9. An environmentally resistant coating for combustion chamber and nozzle components of a rocket engine, comprising:
    a bond coat applied to the surface of the components; and
    a NiAl top coat applied on the bond coat;
    wherein the bond coat and the NiAl top coat are consolidated to form a thermal barrier coating and the components are composed of a copper alloy;
    wherein the NiAl top coat comprises an outermost coat.

10. The coating as recited in claim 9, wherein the bond coat comprises a nickel layer.

11. The coating as recited in claim 9, wherein the bond coat comprises a bond coat deposited using a vacuum plasma spray technique.

12. The coating as recited in claim 9, wherein the NiAl top coat comprises a NiAl top coat deposited using a vacuum plasma spray technique.

13. The coating as recited in claim 9, wherein the environmentally resistant thermal barrier coating is formed through the bond coat and the NiAl top coat consolidated through hot isostatically pressing.

14. The coating as recited in claim 9, wherein the NiAl top coat comprises a layer having an aluminum content of between 30–60 at. %.

15. An environmentally resistant coating for combustion chamber and nozzle components of a rocket engine, comprising:
    a bond coat applied to the surface of the components; and
    a NiAl top coat applied on the bond coat;
    wherein the bond coat and the NiAl top coat are consolidated to form a thermal barrier coating and the components are composed of a copper alloy; and wherein the copper alloy comprises an alloy having a composition of Cu-8(at. %)Cr-4(at. %)Nb.

16. An environmentally resistant coating for combustion chamber and nozzle components of a rocket engine, comprising:

a bond coat applied to the surface of the components; and a NiAl top coat applied on the bond coat;

wherein the bond coat and the NiAl top coat are consolidated to form a thermal barrier coating and the components are composed of a copper alloy; and wherein the bond coat comprises a layer composed of at least one of copper and an alloy of copper and chromium.

* * * * *